United States Patent
Sun et al.

(10) Patent No.: US 10,836,879 B2
(45) Date of Patent: Nov. 17, 2020

(54) PROCESS FOR FOAMING POLYOLEFIN COMPOSITIONS USING A FLUORORESIN/BORON NITRIDE MIXTURE AS A NUCLEATING AGENT

(71) Applicants: Gangwei Sun, Shanghai (CN); Mohamed Esseghir, Collegeville, PA (US); Dow Global Technologies LLC, Midland, MI (US)

(72) Inventors: Gangwei Sun, Shanghai (CN); Mohamed Esseghir, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 118 days.

(21) Appl. No.: 16/081,514

(22) PCT Filed: Mar. 28, 2016

(86) PCT No.: PCT/CN2016/077478
§ 371 (c)(1),
(2) Date: Aug. 31, 2018

(87) PCT Pub. No.: WO2017/166004
PCT Pub. Date: Oct. 5, 2017

(65) Prior Publication Data
US 2019/0092918 A1    Mar. 28, 2019

(51) Int. Cl.
| C08J 9/00 | (2006.01) |
| C08L 23/06 | (2006.01) |
| C08L 27/18 | (2006.01) |
| C08J 9/12 | (2006.01) |
| C08K 3/38 | (2006.01) |
| H01B 3/44 | (2006.01) |
| C08K 5/16 | (2006.01) |
| C08J 9/14 | (2006.01) |

(52) U.S. Cl.
CPC ............. *C08J 9/0061* (2013.01); *C08J 9/00* (2013.01); *C08J 9/0066* (2013.01); *C08J 9/122* (2013.01); *C08J 9/146* (2013.01); *C08K 3/38* (2013.01); *C08K 5/16* (2013.01); *C08L 23/06* (2013.01); *C08L 27/18* (2013.01); *H01B 3/441* (2013.01); *H01B 3/445* (2013.01); *C08J 2201/03* (2013.01); *C08J 2203/06* (2013.01); *C08J 2207/06* (2013.01); *C08J 2323/06* (2013.01); *C08J 2423/06* (2013.01); *C08J 2427/18* (2013.01); *C08K 2003/385* (2013.01); *C08L 2203/20* (2013.01); *C08L 2203/202* (2013.01); *C08L 2205/03* (2013.01); *C08L 2205/24* (2013.01); *C08L 2207/062* (2013.01); *C08L 2207/066* (2013.01)

(58) Field of Classification Search
CPC ..... C08K 2003/385; C08J 9/00; C08J 9/0061; C08J 9/0066; C08J 2427/18
See application file for complete search history.

(56) References Cited

U.S. PATENT DOCUMENTS

| 4,303,771 A | 12/1981 | Wagner et al. |
| 4,394,460 A | 7/1983 | Chung et al. |
| 5,180,754 A | 1/1993 | Morita et al. |
| 5,246,783 A | 9/1993 | Spenadel et al. |
| 5,324,800 A | 6/1994 | Welborn, Jr. et al. |
| 5,837,173 A | 11/1998 | Vita et al. |
| 6,121,335 A | 9/2000 | Higashikubo et al. |
| 6,127,441 A | 10/2000 | Sakamoto et al. |
| 6,284,810 B1 | 9/2001 | Burnham et al. |
| 6,492,596 B1 | 12/2002 | Higashikubo et al. |
| 6,496,629 B2 | 12/2002 | Ma et al. |
| 6,512,013 B2 | 1/2003 | Hrivnak |
| 6,714,707 B2 | 3/2004 | Rossi et al. |
| 10,304,585 B2 * | 5/2019 | Isaka ............... H01B 3/445 |
| 2004/0220288 A1 | 11/2004 | Pruss et al. |
| 2006/0045439 A1 | 3/2006 | Brown et al. |
| 2008/0242754 A1 | 10/2008 | Champagne et al. |
| 2009/0018225 A1 | 1/2009 | Gemmel et al. |
| 2009/0068429 A1 | 3/2009 | Kmiec et al. |

FOREIGN PATENT DOCUMENTS

| JP | 200034492 A | 2/2000 |
| JP | 2006339099 A | 12/2006 |
| JP | 04879613 | 2/2012 |
| WO | WO-2014115623 A1 * | 7/2014 ............... C08K 5/42 |

OTHER PUBLICATIONS

Machine Translation of JP 2007238829 (Year: 2020).*
PCT/CN2016/077478, International Search Report and Written Opinion dated Dec. 30, 2016.
PCT/CN2016/077478, International Preliminary Report on Patentability dated Oct. 2, 2018.

* cited by examiner

*Primary Examiner* — Michael M Dollinger

(57) ABSTRACT

The process of foaming a polyolefin composition using as a nucleator a combination of a fluororesin and a boron nitride at a fluororesin-to-boron nitride weight ratio of less than 4:1. The synergistic effect between these two nucleating agents results in a higher nuclei density and a foamed product with a smaller average cell size as compared to processes using and products produced by the use of neat PTFE or neat boron nitride alone as the nucleating agent.

8 Claims, No Drawings

PROCESS FOR FOAMING POLYOLEFIN COMPOSITIONS USING A FLUORORESIN/BORON NITRIDE MIXTURE AS A NUCLEATING AGENT

FIELD

Various embodiments of the present disclosure relate to processes for foaming polyolefin compositions. Other aspects concern foaming polyolefin compositions using a combination fluororesin/boron nitride nucleating agent and foamed compositions made therefrom.

INTRODUCTION

Typically, a foamed insulation layer of a high-frequency telecommunications cable is produced by first mixing a nucleating agent with a polymer (e.g., polyethylene). The resulting foamable composition is then extruded in the presence of a physical foaming agent (e.g., gases, such as nitrogen, carbon dioxide, chlorinated fluorocarbons, freons, helium, neon, argon, krypton, xenon, and radon), which is injected into the polymer inside an extruder. Nucleating agents for such foaming can include azodicarbonamide ("ADCA") and 4,4'-oxybisbenzenesulfonylhydrazide ("OBSH"), which thermally decompose in the extruder and form a number of fine nuclei in the polymer melt. However, the byproducts of decomposed ADCA and OBSH have high polarity, which are well known to have a significant negative effect on the electrical performance (dissipation factor) of a telecommunications cable.

Compared to ADCA and OBSH, fluororesin powder, such as polytetrafluoroethylene ("PTFE"), is a nucleating agent that exhibits a significantly lesser effect on electrical performance and is free of the decomposition issues associated with ADCA and OBSH. PTFE has been and is currently used as a nucleating agent for foaming compositions for use as insulation in telecommunications cables, but improvements are still desired, particularly with respect to dispersion of the nucleating agent within the foamable composition (i.e., the polymer matrix), and in the formation of small, uniformly sized cells within the foamed product.

SUMMARY

One embodiment is a process of foaming a polyolefin composition using as a nucleator a combination of a fluororesin and a boron nitride at a fluororesin-to-boron nitride weight ratio of less than 4:1.

Another embodiment is a foamable composition comprising, in weight percent based on the total weight of the composition:
(a) 45 to 95% HDPE;
(b) 4 to 54% LDPE;
(c) 0.1 to 1% of a combination of a fluororesin and a boron nitride at a fluororesin-to-boron nitride weight ratio of less than 4:1.

DETAILED DESCRIPTION

Various embodiments of the present disclosure concern foamable compositions comprising a polyolefin and a nucleating agent comprising a fluororesin and a boron nitride. Additional embodiments of the present disclosure concern processes for making foamed compositions and articles of manufacture comprising such foamed compositions.

Polyolefins

As just noted, the foamable and foamed compositions of the present disclosure comprise polyolefins. "Polyolefin" and like terms means a polymer derived from one or more simple olefin monomers (e.g., ethylene, propylene, 1-butene, 1-hexene, 1-octene and the like). The olefin monomers can be substituted or unsubstituted and if substituted, the substituents can vary widely. If the polyolefin is to contain unsaturation, then at least one of the comonomers can be at least one non-conjugated diene, such as 1,7-octadiene, 1,9-decadiene, 1,11-dodecadiene, 1,13-tetradecadiene, 7-methyl-1,6-octadiene, 9-methyl-1,8-decadiene and the like. Many polyolefins are thermoplastic. Polyolefins include but are not limited to polyethylene, polypropylene, polybutene, polyisoprene, and their various interpolymers.

In various embodiments, the polyolefin can comprise or consist of one or more ethylene-based polymers. As used herein, "ethylene-based" polymers are polymers prepared from ethylene monomers as the primary (i.e., greater than 50 weight percent ("wt %") based on pre-polymerization weight) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as catalysts, initiators, solvents, and chain transfer agents.

In an embodiment, the ethylene-based polymer can be an ethylene/alpha-olefin ("α olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a C3-20 (i.e., having 3 to 20 carbon atoms) linear, branched or cyclic α-olefin. Examples of C3-20 α-olefins include propene, 1-butene, 4-methyl-1-pentene, 1-hexene, 1-octene, 1-decease, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, molecular weight, molecular weight distributions, densities, etc). If a blend of ethylene-based polymers is employed, the polymers can be blended by any in-reactor or post-reactor process.

In an embodiment, the ethylene-based polymer can comprise or consist of a low-density polyethylene ("LDPE"). LDPEs are generally highly branched ethylene homopolymers, and can be prepared via high pressure processes (i.e., HP-LDPE). LDPEs suitable for use herein can have a density ranging from 0.91 to 0.94 g/cm$^3$. In various embodiments, the LDPE can have a density of at least 0.915 g/cm$^3$, but less than 0.94 g/cm$^3$, or less than 0.93 g/cm$^3$, or in the range of from 0.920 to 0.925 g/cm$^3$. Polymer densities provided herein are determined according to ASTM International ("ASTM") method D792. LDPEs suitable for use herein can have a melt index ($I_2$) of less than 20 grams per 10 minutes ("g/10 min."), or ranging from 0.1 to 10 g/10 min., from 2 to 8 g/10 min., from 4 to 8 g/10 min., or have an $I_2$ of about 6 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

An example of a suitable commercially available LDPE includes, but is not limited to, AXELERON™ CX B-1258 NT, available from The Dow Chemical Company, Midland, Mich., USA.

In an embodiment, the ethylene-based polymer can comprise or consist of a linear-low-density polyethylene ("LLDPE"). LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a melt index ($I_2$) ranging from 1 to 20 g/10 min., or from 3 to 8 g/10 min.

In an embodiment, the ethylene-based polymer can comprise or consist of a medium-density polyethylene ("MDPE"). MDPEs are ethylene-based polymers having densities generally ranging from 0.926 to 0.940 g/cm$^3$. In various embodiments, the MDPE can have a density ranging from 0.930 to 0.939 g/cm$^3$. The MDPE can have a melt index ($I_2$) ranging from 0.1 g/10 min., or 0.2 g/10 min., or 0.3 g/10 min., or 0.4 g/10 min., up to 5.0 g/10 min., or 4.0 g/10 min., or 3.0 g/10 min., or 2.0 g/10 min., or 1.0 g/10 min.

In one or more embodiments, the ethylene-based polymer can comprise or consist of a high-density polyethylene ("HDPE"). The high-density polyethylene suitable for use herein can be any high-density polyethylene known or hereafter discovered in the art. As known to those of ordinary skill in the art, HDPEs are ethylene-based polymers having densities of at least 0.940 g/cm$^3$. In an embodiment, the HDPE can have a density from 0.940 to 0.980 g/cm$^3$, from 0.950 to 0.970 g/cm$^3$, or from 0.960 to 0.970 g/cm$^3$. The HDPE can have a peak melting temperature of at least 124° C., or from 124 to 135° C. The HDPE can have a melt index ($I_2$) ranging from 0.1 g/10 min., or 0.2 g/10 min., or 0.3 g/10 min., or 0.4 g/10 min., up to 66.0 g/10 min., or 20.0 g/10 min., or 15.0 g/10 min., or, 10.0 g/10 min. In various embodiments, the HDPE can have a melt index ($I_2$) in the range of from 6.0 to 10.0 g/10 min., or from 7.0 to 9.0 g/10 min. Also, the HDPE can have a polydispersity index ("PDI") in the range of from 1.0 to 30.0, or in the range of from 2.0 to 15.0, as determined by gel permeation chromatography.

The HDPE suitable for use herein can be either unimodal or bimodal. As used herein, "unimodal" denotes an HDPE having a molecular weight distribution ("MWD") such that its gel permeation chromatography ("GPC") curve exhibits only a single peak with no discernible second peak, or even a shoulder or hump, relative to such single peak. In contrast, as used herein, "bimodal" means that the MWD in a GPC curve exhibits the presence of two component polymers, such as by having two peaks or where one component may be indicated by a hump or shoulder relative to the peak of the other component polymer. In various embodiments, the HDPE is unimodal. In other embodiments, the HDPE is bimodal.

Preparation methods for unimodal HDPEs are well known in the art. Any methods known or hereafter discovered for preparing a unimodal HDPE having the desired properties may be employed for making the unimodal HDPE. A suitable preparation method for making the unimodal HDPE can be found, for example, in U.S. Pat. No. 4,303,771 or 5,324,800.

An example of a commercially available unimodal HDPE includes, but is not limited to, AXELERON™ CX A-6944NT, available from The Dow Chemical Company, Midland, Mich., USA.

When the HDPE employed is a bimodal HDPE, such HDPE can comprise a first polymeric component and a second polymeric component. In various embodiments, the first component can be an ethylene-based polymer; for example, the first component can be a high-molecular-weight ethylene homopolymer or ethylene/alpha-olefin copolymer. The first component may comprise any amount of one or more alpha-olefin copolymers. For example, the first component can comprise less than 10 wt % of one or more alpha-olefin comonomers, based on the total first component weight. The first component may comprise any amount of ethylene; for example, the first component can comprise at least 90 wt % of ethylene, or at least 95 wt % of ethylene, based on the total first component weight.

The alpha-olefin comonomers present in the first component of the bimodal HDPE typically have no more than 20 carbon atoms. For example, the alpha-olefin comonomers may have from 3 to 10 carbon atoms, or from 3 to 8 carbon atoms. Exemplary alpha-olefin comonomers include, but are not limited to, propylene, 1-butene, 1-pentene, 1-hexene, 1-heptene, 1-octene, 1-nonene, 1-decease, and 4-methyl-1-pentene. In an embodiment, the alpha-olefin comonomers can be selected from the group consisting of propylene, 1-butene, 1-hexene, and 1-octene. In other embodiments, the alpha-olefin comonomers can be selected from the group consisting of 1-hexene and 1-octene.

The first component of the bimodal HDPE can have a density in the range of from 0.915 to 0.940 g/cm$^3$, from 0.920 to 0.940 g/cm$^3$, or from 0.921 to 0.936 g/cm$^3$. The first component can have a melt index ($I_{21.6}$) in the range of from 0.5 to 10 g/10 min., from 1 to 7 g/10 min., or from 1.3 to 5 g/10 min. The first component can have a molecular weight in the range of from 150,000 to 375,000 g/mol, from 175,000 to 375,000 g/mol, or from 200,000 to 375,000 g/mol.

The second polymeric component of the bimodal HDPE can be an ethylene-based polymer; for example, the second component can be a low-molecular-weight ethylene homopolymer. The ethylene homopolymer may contain trace amounts of contaminate comonomers, for example alpha-olefin comonomers. In various embodiments, the second component can comprise less than 1 wt % of one or more alpha-olefin comonomers, based on the weight of the second component. For example, the second component may comprise from 0.0001 to 1.00 wt % of one or more alpha-olefin comonomers, or from 0.001 to 1.00 percent by weight of one or more alpha-olefin comonomers. The second component can comprise at least 99 wt % of ethylene, or in the range of from 99.5 to 100 wt % of ethylene, based on the weight of the second component.

The second component of the bimodal HDPE can have a density in the range of from 0.965 to 0.980 g/cm$^3$, or from 0.970 to 0.975 g/cm$^3$. The second component can have a melt index ($I_2$) in the range of from 50 to 1,500 g/10 min., from 200 to 1,500 g/10 min., or from 500 to 1,500 g/10 min. The second component can have a molecular weight in the range of 12,000 to 40,000 g/mol, from 15,000 to 40,000 g/mol, or from 20,000 to 40,000 g/mol.

Preparation methods for bimodal HDPEs are well known in the art. Any methods known or hereafter discovered for preparing a bimodal HDPE having the desired properties may be employed for making the bimodal HDPE. A suitable preparation method for making bimodal HDPE can be found, for example, in U.S. Patent Application Publication No. 2009-0068429, paragraphs [0063] to [0086].

An example of a commercially available bimodal HDPE includes, but is not limited to, DMDA-1250NT, available from The Dow Chemical Company, Midland, Mich., USA.

In an embodiment, the polyolefin component of the foamable composition can comprise a combination of any two or more of the above-described ethylene-based polymers.

In various embodiments, the polyolefin component of the foamable composition comprises a combination of HDPE and LDPE.

In one or more embodiments, the polyolefin component of the foamable composition consists of a combination of HDPE and LDPE.

In various embodiments, the polyolefin component of the foamable composition constitutes in the range of from 49 to 99 wt %, based on the total weight of the foamable composition.

In one or more embodiments, the foamable composition comprises HDPE in an amount of at least 45 weight percent ("wt %"), in the range of from 45 to 95 wt %, from 55 to 85 wt %, or from 60 to 80 wt %, based on the entire weight of the foamable composition.

In one or more embodiments, the foamable composition comprises LDPE in an amount of at least 4 wt %, in the range of from 4 to 54 wt %, from 14 to 44 wt %, or from 19 to 39 wt %, based on the entire weight of the foamable composition.

When a combination of two or more ethylene-based polymers (such as a combination of HDPE and LDPE) is employed as the polyolefin, the mixtures or blends may be prepared by any suitable means known in the art such as, for example, dry blending in a pelletized form in desired proportions followed by melt blending in an apparatus such as a screw extruder or a BANBURY™ mixer. Dry blended pellets may be directly melt processed into a final solid state article by, for example, extrusion or injection molding. The blends may also be made by direct polymerization. Direct polymerization may use, for example, one or more catalysts in a single reactor or two or more reactors in series or parallel and vary at least one of operating conditions, monomer mixtures and catalyst choice.

Nucleator

Fluororesin Component

Any known or hereafter discovered fluororesin can be employed herein. Examples of suitable fluororesins include, but are not limited to, polytetrafluoroethylene ("PTFE"), tetrafluoroethylene-perfluoroalkyl vinyl ether copolymer ("PFA"), ethylene-tetrafluoroethylene copolymer ("ETFE"), tetrafluoroethylene-hexafluoropropylene copolymer ("FEP"), tetrafluoroethylene-ethylene copolymer, polyvinylidene fluoride ("PVdF"), polychlorotrifluoroethylene ("PCTFE"), chlorotrifluoroethylene-ethylene copolymer ("ECTFE") and the like, with preference given to PTFE, PFA and ETFE. In one or more embodiments, the fluororesin comprises PTFE. In one or more embodiments, the fluororesin consists of PTFE.

Fluororesin particles, particularly those of less than a micron in size, tend to agglomerate. Some commercially available fluororesin powders comprise a high concentration of agglomerates of at least 5 microns (μm) in size, e.g., diameter. Typically the size of the agglomerates range from 2 to 50 microns, more typically from 5 to 20 microns and even more typically from 5 to 15 microns. Typically, the amount of fluororesin agglomerates of at least 5 μm in size in these powders is at least 80%, more typically at least 82%, and even more typically at least 85%. These powders do not disperse well in many polyolefins, e.g., HDPE and/or LDPE.

While agglomerated fluororesin particles, i.e., agglomerates, as described above can be used herein, in one embodiment unagglomerated particles are used. In one embodiment the fluororesin components of the nucleator are unagglomerated particles of less than a micron in size, or less than 0.5 micron in size, or less than 0.3 micron in size, which may be commingled with agglomerates that were either originally submicron in size or were reduced in size from greater than a micron to less than a micron. In one embodiment the fluororesin component of the nucleator used in the practice of the invention comprises less than 10 wt %, or 9 wt %, or 8 wt %, or 7 wt %, or 6 wt %, or 5 wt %, or 4 wt %, or 3 wt %, or 2 wt %, or 1 wt % of agglomerates greater than a micron in size, but the smaller the amount of such agglomerates, and thus the greater the amount of submicron particles and submicron agglomerates, the better the dispersion of the fluororesin in the polyolefin, and the more evenly distributed are the cell sizes in the foamed product.

Agglomerated particles can be separated from one another by any conventional means, e.g., grinding, mixing or stirring (typically at a relatively high speed), etc. In one embodiment a fluororesin comprising agglomerates of one micron or greater, typically of 3, or 4, or 5 microns or greater, is subjected to any procedure, treatment, etc. that will reduce the majority, preferably 60%, 70%, 80%, 90% or more, of the such agglomerates to either unagglomerated particles of less than a micron in size, or agglomerates of less than a micron in size before the nucleator is mixed with the polyolefin.

In one embodiment the fluororesin, comprising agglomerates of one micron or greater, typically of 3, or 4, or 5 microns or greater, can first be mixed with the polyolefin, with or without the boron nitride component of the nucleator, to form a masterbatch, and then the masterbatch can be subjected to any procedure, treatment, etc. that will reduce the majority, preferably 60%, 70%, 80%, 90% or more, of the such agglomerates to either unagglomerated particles of less than a micron in size, or agglomerates of less than a micron in size. Typically the masterbatch comprises from 1 to 50, more typically from 5 to 50 and even more typically from 15 to 30 wt % fluororesin, and from 50 to 99, more typically from 60 to 95 and even more typically from 70 to 85 wt % polyolefin. After the masterbatch is subjected to the fluororesin size reduction procedure, treatment, etc., the masterbatch can be mixed with the boron nitride component of the nucleator (if it does not already comprise that component) and the polyolefin to be foamed under conditions and for a sufficient period of time to uniformly disperse the unagglomerated particles and agglomerates within the polyolefin before the start of the foaming process.

In one embodiment the fluororesin, comprising agglomerates of one micron or greater, typically of 3, or 4, or 5 microns or greater, can first be mixed with the polyolefin, with or without the boron nitride component of the nucleator, in the amount desired for the practice of the foaming process, and then the polyolefin can be subjected to any procedure, treatment, etc. for a sufficient amount of time that will both (1) reduce the majority, preferably 60%, 70%, 80%, 90% or more, of the such agglomerates to either unagglomerated particles of less than a micron in size, or agglomerates of less than a micron in size, and (2) substantially uniformly disperse these unagglomerated particles and reduced agglomerates within the polyolefin before the foaming process commences. The boron nitride component of the nucleator can be added to the polyolefin before, simultaneously with, or after the addition of the fluororesin, and before or after the agglomerates of the fluororesin are subjected to size reduction.

The nucleator, preferably PTFE comprising particles and agglomerates of less than a micron in size, can be added to the polyolefin composition comprising or consisting essentially of HDPE and LDPE, by any conventional means. The nucleator can be added neat, in combination with one or more other additives, e.g., antioxidant, cell stabilizer, etc., or as part of a masterbatch. The nucleator is mixed with the polyolefin composition to achieve an essentially homogeneous dispersion of nucleator in the polyolefin composition and to this end, batch mixing, e.g., through the use of a BUSS™ kneader, is typically preferred to mixing in an extruder. If the nucleator is first mixed with the polyolefin composition in an extruder, then it is typically added to the polyolefin composition prior to injection of the gas for foaming.

Particle size can be determined by any method known in the art. In one embodiment, the determination of particle size and proportion (% by number) of fluororesin powder can be determined as follows. A dispersion comprising a fluororesin powder obtained by a dispersing treatment for about 2 minutes under ultrasonication of about 35-40 kHz and ethanol, wherein the fluororesin powder is contained in an amount to make a laser permeation (proportion of output light to incident light) of the dispersion 70-95%, is subjected to a microtrack particle size analyzer under relative refraction (determination is done based on the ratio of diffraction ratio (about 0.99) of fluororesin powder to that of ethanol or according to the measure of the above-mentioned particle size analyzer which is the nearest to the ratio (e.g., 1.02)) and flow type cell measurement mode to determine particle size ($D_1, D_2, D_3$ . . . ) of individual particles and the number ($N_1, N_2, N_3$ . . . ) of particles having each particle size based on the optical diffraction of the laser. In this case, the particle size (D) of individual particles is automatically measured by the microtrack particle size analyzer wherein particles having various shapes are measured in terms of the diameters of the corresponding spheres. Therefore, the proportion (% by number) of the particle size $D_1$ is expressed by the percentage of the number of these particles ($N_1$) to the number of the entire particles ($\Sigma N$). The proportion of the particles having a particle size of 0.1-0.5 µm is expressed by the percentage of the number of the particles having a particle size of 0.1-0.5 µm to the total number of the existing particles ($\Sigma N$). Similarly, the proportion of the particles having a particle size of not less than 5 µm is expressed by the percentage of the number of the particles having a particle size of not less than 5 µm to the total number of the existing particles ($\Sigma N$). On the other hand, the average particle size of the nucleator of the present invention can be calculated using the total number of existing particles ($\Sigma N$) and the total of the product of the cube of the particle size of respective particles and the total number of existing particles ($\Sigma ND^3$), according to the following formula Average Particle Size $(\mu m) = (\Sigma ND^3/\Sigma N)^{1/3}$ Calculation of particle size is further illustrated in U.S. Pat. No. 6,121,335. The calculation of agglomerate size is determined in the same manner as that described above for particle size determination.

While the shape of the fluororesin particles and agglomerates is not particularly limited, it is preferable that the particles and agglomerates are primarily sphere-like in shape to produce a foam comprising fine cells and superior in uniform foaming.

Fluororesin/Boron Nitride Mixture Nucleator

As noted above, the nucleator is a mixture of a fluororesin (e.g., PTFE) and boron nitride. The weight ratio of fluororesin to boron nitride is less than 4:1, or can be in the range of from 1:1 to 1:4. The boron nitride can be employed in the form of a powder, which can have a particle size (D50) in the range of from 1 to 50 µm, from 10 to 40 µm, or from 25 to 35 µm.

The amount of the nucleator present in the foamable composition (i.e., the combined amount of fluororesin and boron nitride) can be in the range of from 0.01 to 1 wt %, from 0.05 to 0.9 wt %, from 0.1 to 0.8 wt %, from 0.3 to 0.7 wt %, or from 0.4 to 0.6 wt %, based on the total weight of the foamable composition. In various embodiments, the combined amount of fluororesin and boron nitride in the foamable composition can be about 0.5 wt %, based on the total weight of the foamable composition.

In various embodiments, the amount of fluororesin present in the foamable composition, subject to the above ratio restrictions, can be in the range of from 0.01 to 0.75 wt %, from 0.05 to 0.5 wt %, or from 0.1 to 0.25 wt %, based on the total weight of the foamable composition.

In various embodiments, the amount of boron nitride present in the foamable composition, subject to the above ratio restrictions, can be in the range of from 0.01 to 0.9 wt %, from 0.1 to 0.8 wt %, or from 0.25 to 0.4 wt %, based on the total weight of the foamable composition.

The nucleator can be added to the polyolefin composition by any conventional or hereafter discovered means. The nucleator can be added neat, in combination with one or more other additives (e.g., antioxidant, cell stabilizer, etc.) or as part of a masterbatch. The nucleator is typically added as a mixture of fluororesin and boron nitride, but the fluororesin and boron nitride can be added separately and the mixture formed in situ within the polyolefin composition. The nucleator is mixed with the polyolefin composition to achieve an essentially homogeneous dispersion of nucleator in the polyolefin composition and to this end, batch mixing, e.g., through the use of a Banbury Mixer, or a continuous mixer such as Farrel Continous Mixer (FCM) or a twin-screw extruder or BUSS™ kneader. These are typically preferred to mixing in a single-screw extruder. If the nucleator is first mixed with the polyolefin composition in an extruder, then it is typically added to the polyolefin composition prior to injection of the gas for foaming.

Use of the fluororesin/boron nitride nucleator produces a higher performance product as compared to a product produced using either a fluororesin, particularly PTFE, or boron nitride alone as the nucleator. The products exhibit enhanced properties in terms of expansion ratio, cell size and cell size uniformity as well as surface smoothness. In this hybrid nucleating agent, the fluororesin and boron nitride are both "passive" nucleating agents. The synergistic effect between these two nucleating agents results in a higher nuclei density and a foamed product with smaller cell size as compared to processes using and products produced by the use of neat fluororesin or neat boron nitride alone as the nucleating agent, provided that the nucleator components are present in a fluororesin-to-boron nitride weight ratio of less than 4:1.

Additives

The polyolefin composition of the present disclosure may contain one or more additives as necessary or desired. Representative additives include but are not limited to, processing aids, lubricants, antioxidants, cell stabilizers, foaming aids, surfactants, flow aids, viscosity control agents, coloring agents, copper inhibitors, and the like. These additives can be added to the polymer(s) either before or during processing. The amount of any particular additive in the polyolefin composition is typically from 0.01 to 1 wt %, more typically from 0.01 to 0.5 wt % and even more typically from 0.01 to 0.3 wt %, and the total amount of additives in the polyolefin composition, if present at all, is typically from 0.01 to 5 wt %, more typically from 0.01 to 2 wt % and even more typically from 0.01 to 1 wt %.

In one or more embodiments, the foamable composition comprises antioxidants in an amount ranging from 0.01 to 0.3 wt %, based on the total weight of the foamable composition.

In one or more embodiments, the foamable composition comprises cell stabilizers in an amount ranging from 0.01 to 0.3 wt %, based on the total weight of the foamable composition.

Foaming Agent

The foaming agent is one or more suitable for the extrusion temperature, foaming conditions, foam forming method and the like. When an insulating foam layer in the final form is to be formed simultaneously with extrusion forming, for example, an inert gas such as nitrogen, a carbon gas (e.g., CO, $CO_2$, etc.), helium, argon and the like, hydrocarbon such as methane, propane, butane, pentane and the like, halogenated hydrocarbons such as dichlorodifluoromethane, dichloromonofluoromethane, monochlorodifluoromethane, trichloromonofluoromethane, monochloropentafluoroethane, trichlorotrifluoroethane and the like are used. The amount of the foaming agent to be used can vary. Typically, it is 0.001-0.1 part by weight, more typically 0.005-0.05 part by weight, per 100 parts by weight of the polyolefin composition to be foamed. The foaming agent may be mixed with the foamable composition in advance or may be supplied into an extruder from a foaming agent supply opening formed on the barrel of the extruder.

Foaming Process

The polyolefin composition can be foamed using known or hereafter discovered methods and equipment. Typically, a foam is produced by extruding the polyolefin composition containing a nucleator using an extruder operated under foaming extrusion conditions, e.g., injection of a foaming agent while the composition is in a high pressure zone and then extruding the composition to a low pressure zone. Foaming processes are further described by C. P. Park in *Polyolefin Foam*, Chapter 9, *Handbook of Polymer Foams and Technology*, edited by D. Klempner and K. C. Frisch, Hanser Publishers (1991).

In an embodiment, a typical extrusion foaming process uses an atmospheric gas (e.g., $CO_2$) to produce a foamed cable insulation as described in CA 2 523 861 C, *Low Loss Foam Composition and Cable Having Low Loss Foam Layer*. Dissolution of the foaming gas into the polymer melt is governed by Henry's law as reported for example in the work of H. Zhang (below) and others. Solubility is a function of the saturation pressure and the Henry's law constant, which itself is a function of temperature. Zhang_Hongtao_201011_MASc_thesis.pdf. Also see *Foam Extrusion: Principles and Practice* by Shau-Tarng Lee, editor. The MuCell® microcellular foam injection molding technology is an example of a commercially practiced foaming process, and it is described generally in U.S. Pat. No. 6,284,810.

Given the above on the importance of adequate pressure control during foaming extrusion, a suitable process would be the one commercially referred to as the MuCell® process, in which adequate pressures are built via specific hardware design, for effective nucleation as reported in U.S. Pat. No. 6,284,810. The method disclosed in this publication relies solely on high pressure drops (dP/dt) for self-nucleation of the foaming gas in the absence of an "auxiliary nucleating agent" (Col. 4, line 25-30).

Foamed Composition

The resulting foamed composition can have a foaming level ("porosity") of at least 70, at least 75, at least 77, or at least 78 percent, measured by comparing the densities of the neat polyolefin and the foamed composition as described in the Test Methods section, below. In various embodiments, the foaming level of the foamed composition can be less than 80 percent.

In various embodiments, the foamed composition can have an average cell size of less than 215 μm, less than 210 μm, or less than 207 μm. Additionally, the foamed composition can have an average cell size of at least 180 μm, or at least 190 μm. Average cell size of the foamed composition is determined according to the procedure provided in the Test Methods section, below.

In various embodiments, the foamed composition can have a cell density of at least 9.80E+04 per $cm^3$, at least 9.90E+04 per $cm^3$, at least 1.00E+05 per $cm^3$, or at least 1.05E+05 per $cm^3$.

Articles of Manufacture

In an embodiment, the foamable or foamed composition of this disclosure can be applied to a cable, a wire, or a conductor as a sheath or insulation layer in known amounts and by known methods, for example, with the equipment and methods described in U.S. Pat. Nos. 5,246,783, 6,714, 707, 6,496,629 and USPA 2006/0045439. Typically, the foamed composition can be prepared in a reactor-extruder equipped with a cable-coating die and, after the components of the composition are formulated, the composition is extruded over the cable or conductor as the cable or conductor is drawn through the die. Foaming of the polyolefin composition can be performed at the time of extrusion over the cable or conductor. In such embodiments, extrusion can be performed at a temperature greater than the activation temperature of the foaming agent.

Other articles of manufacture that can be prepared from the foamed polymer compositions of this disclosure include fibers, ribbons, sheets, tapes, tubes, pipes, weather-stripping, seals, gaskets, hoses, foams, footwear bellows, bottles, and films. These articles can be manufactured using known equipment and techniques.

Definitions

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

"Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Composition" and like terms mean a mixture of two or more materials.

"Polyolefin composition" and like terms mean, in the context of this invention, a composition comprising at least one polyolefin.

"Nucleator," "nucleating agent" and like terms mean a substance, typically a small particle, that provides a nucleation site or location for bubble formation within a polymer melt. These nucleating agents are used to enhance the cell structure of foaming polymers.

"Agglomerate" and like terms mean a collection of two or more particles group together to constitute a whole. Agglomerates can be of various sizes. An agglomerate will always be larger than the particles from which it is made, but some particles not associated with a particular agglomerate can be larger than the agglomerate. In the practice of this invention, agglomerates are typically and preferably less than one micron is size, more preferably less than 0.5 micron and even more preferably less than 0.3 micron, in size.

"Particle" and like terms mean a unitary mass. Particles can be of various sizes. A fluororesin particle, e.g., a PTFE particle, is a unitary mass of fluororesin. Two or more fluororesin particles grouped together, i.e., in contact with one another, form a fluororesin agglomerate. The fluororesin particles of this disclosure are typically less than one micron, less than 0.5 micron, or less than 0.3 micron, in size.

"Unagglomerated particle" and like terms mean a particle not associated with another particle of like kind. Unagglomerated particles include both particles that have dissociated from an agglomerate, and particles that have not been associated with an agglomerate.

"Masterbatch" and like terms mean a concentrated mixture of additives in a carrier resin. In the context of this invention, a masterbatch comprises a concentrated mixture of nucleator in a polyolefin resin. The masterbatch allows for an efficient addition and dispersion of the nucleator to and in the polyolefin. The manufacture and use of masterbatches are well known to those skilled in the art of manufacturing and fabricating plastics and foam articles.

TEST METHODS

Porosity (Expansion Ratio)

The expansion ratio is calculated based on the density of sample before and after foaming. The density of the foamed article and solid plaque are measured according to ASTM D792.

Expansion ratio=$(1-\rho_{foam}/\rho_{solid})*100\%$

Cell Density and Average Cell Size

The foamed sample is fractured utilizing liquid nitrogen and then slices are cut out using a razor blade. The slices are coated with platinum using an EMITECH™ K575X coater before scanning electron microscopy ("SEM") analysis. The SEM images are acquired on a FEI Nova NanoSEM 630 SEM by Everhart-Thornley detector ("ETD") and Through Lens Detector ("TLD") at an accelerating voltage of 5 kV, working distance around 6.5 mm and spot size of 5. The average cell size is obtained through the analysis of the SEM photographs.

The cell density of the foamed article can be calculated by the following Equation:

$$N_f = \left(\frac{n_c M_c^2}{A_c}\right)^{3/2}$$

$N_f$ represents cell number per cubic centimeter volume in the foamed article, $n_c$ is the cell number in the view area of SEM picture, $A_c$ is the area of SEM picture, and $M_c$ is the magnification.

D, which is the average the cell size, can be calculated by the following Equation:

$$D = \left(\frac{6V_t^2}{\pi N_f}\right)^{1/3}$$

Where $V_t$ represents the expansion ratio of foamed article.

MATERIALS

The following materials are employed in the Examples, below.

The high-density polyethylene ("HDPE") is AXELERON™ CX A-6944 NT which has a melt index ($I_2$) of 8 g/10 min. (ASTM D1238, condition 190° C./2.16 kg), a density of 0.965 g/cm³ (ASTM D792), and is commercially available from The Dow Chemical Company, Midland, Mich., USA.

The low-density polyethylene ("LDPE") is AXELERON™ CX B-1258 NT which has a melt index ($I_2$) of 6 g/10 min. (ASTM D1238, condition 190° C./2.16 kg), a density of 0.922 g/cm³ (ASTM D792), and is commercially available from The Dow Chemical Company, Midland, Mich., USA.

The polytetrafluoroethylene ("PTFE") is ZONYL™ MP 1400, a white, free-flowing PTFE with a particle size (D50) of 10 µm and available from Chemours Company, Wilmington, Del., USA.

The boron nitride is CARBOTHERM™ CTS2M fine, spherical particles with a particle size (D50) of 32 µm, which is available from Saint-Gobain Group, La Défense, Courbevoie, France.

EXAMPLES

Foaming Process

The physical foaming experiment is conducted on a single-screw extruder with gas injection system. The screw diameter is 50 millimeters (mm) with a length to diameter (L/D) ratio of 40. The gas injection point is located at the middle of screw with $CO_2$ as the blowing agent. The temperature profile is 140/175/180(gas injection)/170/145 (static mixer)/143(die). HDPE, LDPE, and nucleating agent powders are dry blended first then fed on the upstream of the extruder. The foamed product is obtained in the shape of a rod.

Example

Prepare seven Comparative Samples (CS1-CS7) and three Samples (S1-S3) according to the formulations provided in Table 1, below, and the foaming process described above. Analyze them according to the Test Methods provided above. Results are provided in Table 1, below.

TABLE 1

Compositions and Properties of CS1-CS7 and S1-S3

|  | CS1 | CS2 | CS3 | CS4 | CS5 | CS6 | CS7 | S1 | S2 | S3 |
|---|---|---|---|---|---|---|---|---|---|---|
| HDPE (wt %) | 70.00 | 70.00 | 70.00 | 70.00 | 70.00 | 70.00 | 70.00 | 70.00 | 70.00 | 70.00 |
| LDPE (wt %) | 29.85 | 29.70 | 29.50 | 29.85 | 29.70 | 29.50 | 29.50 | 29.50 | 29.50 | 29.50 |
| PTFE (wt %) | 0.15 | 0.30 | 0.50 | — | — | — | 0.40 | 0.10 | 0.25 | 0.20 |
| B.N. (wt %) | — | — | — | 0.15 | 0.30 | 0.50 | 0.10 | 0.40 | 0.25 | 0.30 |
| Total: | 100.00 | 100.00 | 100.00 | 100.00 | 100.00 | 100.00 | 100.00 | 100.00 | 100.00 | 100.00 |
| Porosity (%) | 79.1 | 78.5 | 78.8 | 78.6 | 78.9 | 79.3 | 79.6 | 78.8 | 78.6 | 78.8 |
| Avg. Cell Size (μm) | 253 | 225 | 230 | 262 | 229 | 215 | 218 | 203 | 192 | 206 |
| Cell density (N/cm$^3$) | 4.81E+04 | 6.34E+04 | 8.27E+04 | 6.37E+04 | 9.16E+04 | 9.44E+04 | 9.40E+04 | 1.14E+05 | 1.15E+05 | 1.08E+05 |

The results provided in Table 1, above, show that a combination of PTFE with boron nitride has better foaming performance, e.g., finer cell size and higher cell density, than either neat PTFE or boron nitride. The synergistic effect between PTFE and BN on the foaming can be observed. When the ratio of PTFE to BN is less than 4:1, much better foaming performances are achieved, with the best performance being achieved at PTFE-to-BN ratios ranging from 1:1 to 1:4 on a weight basis.

The invention claimed is:

1. A process of foaming a polyolefin composition, comprising the steps:
    mixing a nucleator into a polyolefin, wherein the nucleator is a combination of a fluororesin and a boron nitride at a fluororesin-to-boron nitride weight ratio is in the range of from 1:1 to 1:4 further wherein the polyolefin comprises a high-density polyethylene ("HDPE") and a low-density polyethylene ("LDPE"); and
    foaming the polyolefin composition.

2. The process of claim 1, wherein said polyolefin composition consists of HDPE and LDPE.

3. The process of claim 2, wherein said HDPE constitutes from 45 to 95 weight percent based on the entire weight of said polyolefin composition, wherein said LDPE constitutes from 4 to 54 weight percent based on the entire weight of said polyolefin composition.

4. The process of claim 1, wherein said fluororesin comprises polytetrafluoroethylene ("PTFE").

5. The process of claim 1, wherein said fluororesin and boron nitride are present in a combined amount in the range of from 0.01 to 1 weight percent based on the total weight of said polyolefin composition.

6. A foamable composition comprising, in weight percent based on the total weight of the composition:
    (a) 45 to 95% HDPE;
    (b) 4 to 54% LDPE;
    (c) 0.01 to 1% of a combination of a fluororesin and a boron nitride at a fluororesin-to-boron nitride weight ratio is in the range of from 1:1 to 1:4.

7. A foam prepared from said foamable composition of claim 6.

8. A cable comprising an insulation layer comprising the foam of claim 7.

* * * * *